United States Patent [19]

Hüttlin

[11] Patent Number: 5,282,321
[45] Date of Patent: Feb. 1, 1994

[54] FLUIDIZED BED APPARATUS FOR TREATING PARTICULATE MATERIALS

[76] Inventor: Herbert Hüttlin, Daimlerstrasse 7, 7853 Steinen, Fed. Rep. of Germany

[21] Appl. No.: 958,351

[22] PCT Filed: Jun. 4, 1992

[86] PCT No.: PCT/EP92/01246
§ 371 Date: Dec. 22, 1992
§ 102(e) Date: Dec. 22, 1992

[87] PCT Pub. No.: WO92/21439
PCT Pub. Date: Dec. 10, 1992

[30] Foreign Application Priority Data

Jun. 5, 1991 [DE] Fed. Rep. of Germany ....... 4118433

[51] Int. Cl.$^5$ .............................................. F26B 17/10
[52] U.S. Cl. ...................................... 34/57 E; 34/57A; 34/57 R
[58] Field of Search ................. 34/57 R, 57 A, 57 E, 34/92, 10; 432/15, 58

[56] References Cited

U.S. PATENT DOCUMENTS 4,530,169 7/1985 Okawara ............................ 34/57 E
4,970,804 11/1990 Huttlin ................................ 34/57 A Primary Examiner—Henry A. Bennet
Attorney, Agent, or Firm—Brumbaugh, Graves, Donohue & Raymond

[57] ABSTRACT

A ring of baffle plates (36) with intermediate spaces (38) in which a rising gas stream is given a twist is arranged in a vessel (10) between an entrance space (30, 50) and a fluidized bed space (60) located above the same. Nozzles (40) are disposed in individual intermediate spaces (38) between a pair of baffle plates (36) each for spraying fluidizable substances into the gas stream. The entrance space comprises a first inlet chamber (30) with which only intermediate spaces (38) without nozzles (40) between baffle plates (36) communicate. The intermediate spaces (38) with nozzles (40) are shielded from the first inlet chamber (30) and connected to a second inlet chamber (50) which is adapted to be fed separately from the first inlet chamber with process gas. This provides novel possibilities of influencing a fluidized bed, especially of rendering it more uniform.

5 Claims, 5 Drawing Sheets

FLUIDIZED BED APPARATUS FOR TREATING PARTICULATE MATERIALS

The invention relates to a fluidized bed apparatus for treating particulate materials, comprising
- a vessel with an entrance space and a fluidized bed space located above the same,
- a ring of baffle plates with intermediate spaces in which a gas stream rising from the entrance space to the fluidized bed space is oriented in a predetermined direction, especially given a twist, and
- nozzles disposed in individual intermediate spaces between a pair of baffle plates each for spraying fluidizable substances into the gas stream.

Various embodiments of such an apparatus are known from DE 38 339 723 C1. In those cases a process gas, such as dry air is supplied to the entrance space, either centrally from below or through an immersion tube which extends from above through the fluidized bed space into the entrance space. From the entrance space the process gas flows through all the intermediate spaces defined between the baffle plates into the fluidized bed space. The intermediate spaces in which nozzles are provided have reduced flow cross sections due to these nozzles and, therefore, smaller quantities of process gas per unit time flow through these intermediate spaces than through those without nozzles. Consequently irregularities, not always desirable, may develop in a fluidized bed which is to form in the fluidized bed space. An entirely uniform fluidized bed, for instance, is desired when tablets are to be dried which have been sugar-coated with a liquid sprayed in through the nozzles. It is, therefore, the object of the invention to provide for an additional opportunity in a fluidized bed apparatus for treating particulate materials to influence the fluidized bed, above all to render it more uniform. Particulate materials to be treated in such an apparatus may consist, for example, of round or oblong tablets, pellets, and the like, in other words particles which, being bulk material, leave free interstices. The treatment, for example, may consist of applying a gastric juice resistant coat from an aqueous or organic solution, dispersion, or suspension on to such particles.

The object is met, in accordance with the invention, starting from a fluidized bed apparatus of the kind described initially, in that
- a first inlet chamber is arranged in the entrance space and only intermediate spaces without nozzles between baffle plates communicate with said inlet chamber,
- the intermediate spaces in which nozzles are disposed are shielded from the first inlet chamber and are connected to a second inlet chamber, and
- the inlet chambers are adapted to be fed separately with process gas.

In this manner the flow relationships in the intermediate spaces including nozzles between the baffle plates can be controlled independently of the flow relationships in intermediate spaces which do not include nozzles. The pressure in the second inlet chamber may be higher, the same, or lower than the pressure in the first inlet chamber.

The second inlet chamber preferably is an annular chamber which is concentric with the vessel. In this context it is convenient if passages extend substantially radially from the second inlet chamber to the intermediate spaces in which there are nozzles.

Preferably, the second inlet chamber extends all around a central pipe for the discharge of process gas which pipe begins in an upper region of the fluidized bed space and extends down and out of the vessel.

In an especially convenient embodiment of the invention, separate fans are connected upstream of each of the two inlet chambers.

Furthermore, it is convenient if a return air fan is arranged downstream of the fluidized bed space to maintain negative pressure in the fluidized bed space as compared to the surroundings of the vessel, while positive pressure prevails in the two inlet chambers.

In certain cases the fluidized bed apparatus according to the invention may be kept operating by the return air fan alone. Also in that event can the gas streams reaching the fluidized bed space from the inlet chambers be controlled independently of each other, provided throttling means of any known type are connected upstream of the inlet chambers. In general, however, the mode of operation described with two separately controllable fans disposed upstream of the inlet chambers is preferred.

An embodiment of the invention will be described in greater detail below, with reference to diagrammatic drawings, in which.

Figure 1:
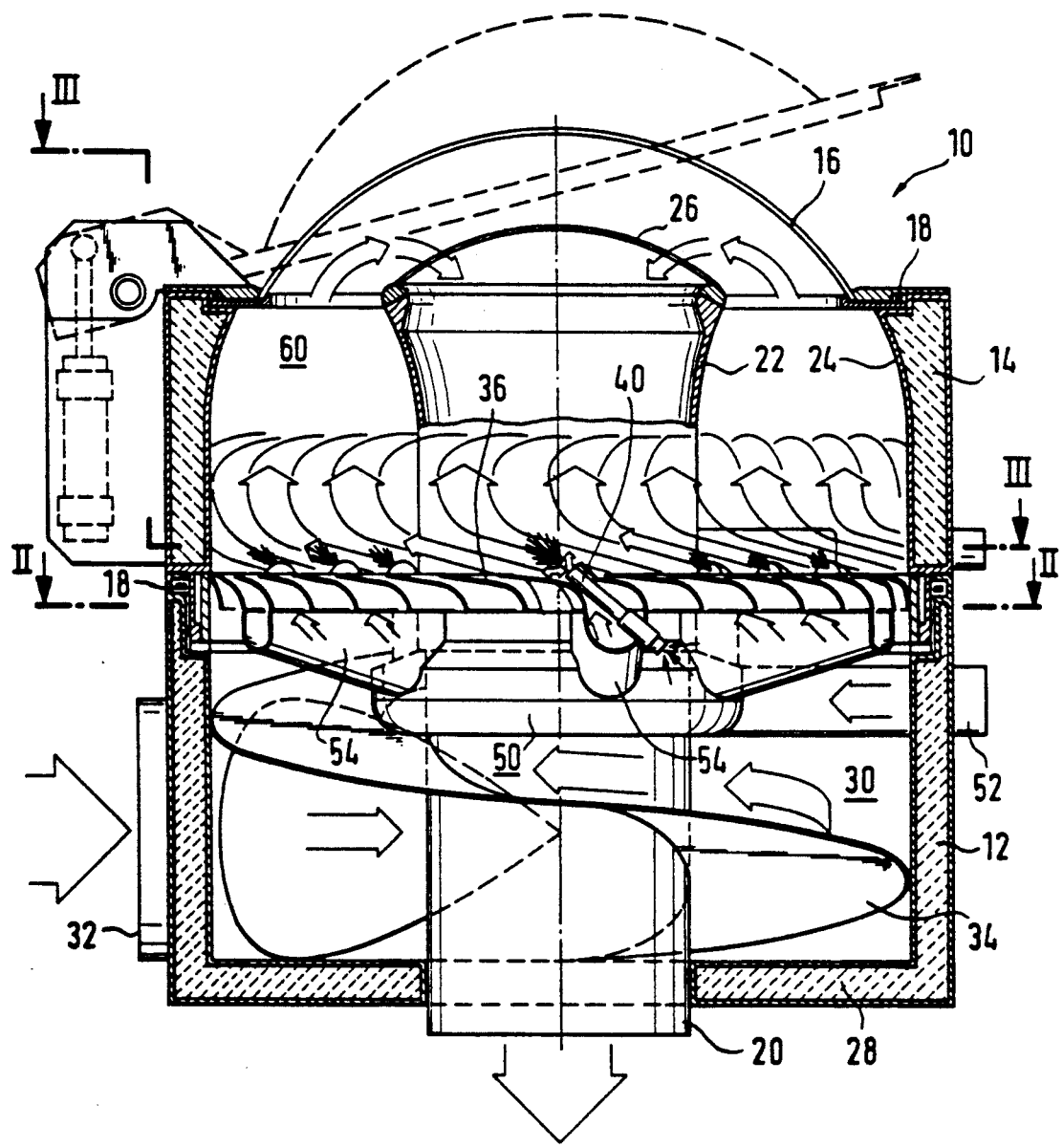
FIG. 1 is a vertical axial section through a vessel of the apparatus according to the invention.
Figure 2:
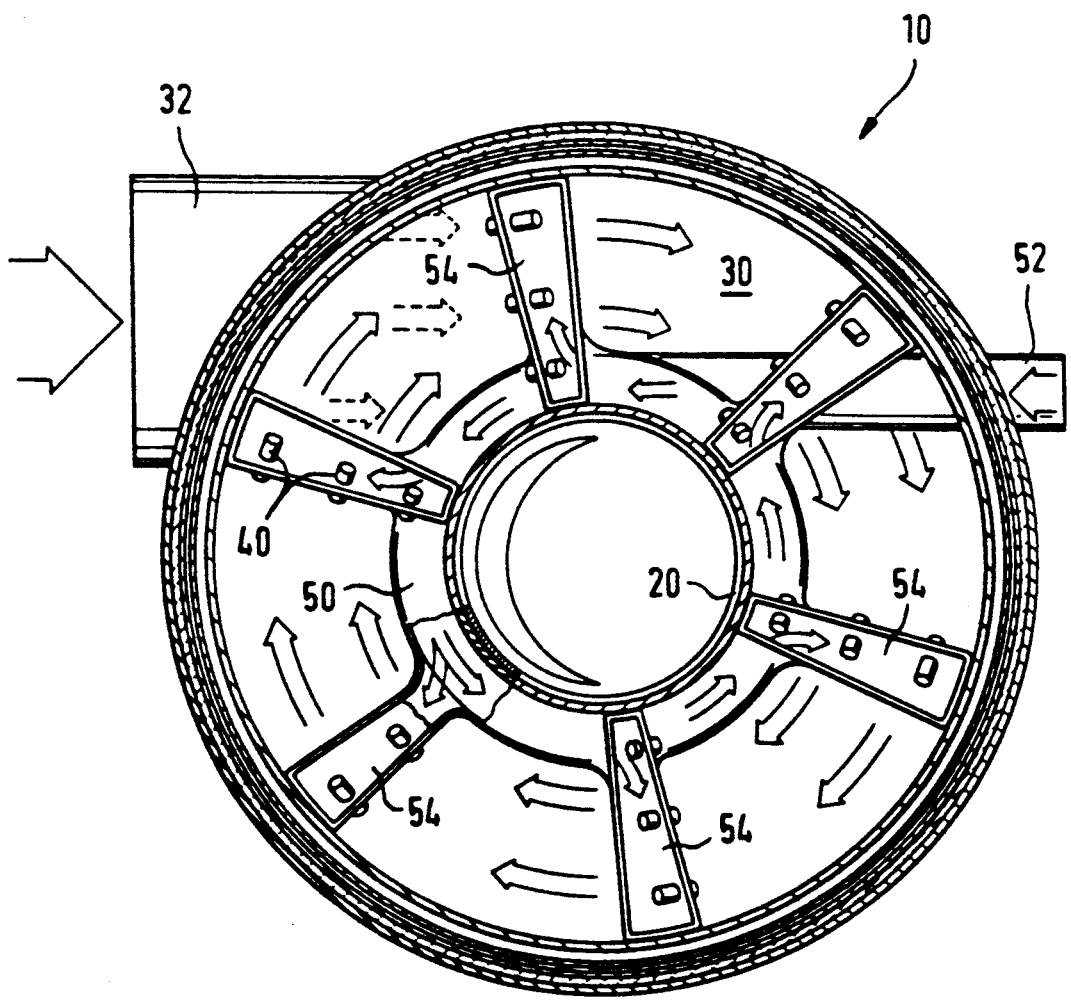
FIG. 2 is the horizontal cross section II—II in FIG. 1.

The fluidized bed apparatus comprises a substantially cylindrical vessel 10 including a pot-shaped lower part 12 and an annular upper part 14 as well as a hingedly connected lid 16. The lower part 12 is sealed off against the upper part 14, and the latter against the lid by expansible seals 18. A central pipe 20 extends through the vessel 10 coaxially with the same and includes a funnel-shaped inlet 22 inside the upper part 14. The inlet 22 begins at the level of the upper edge of the upper part 14 and has a concave curvature, as seen from the outside, surrounded by an inwardly directed curvature 24 of the upper part 14 in such a manner that a reduced annular space remains free between the upper edge of the inlet 22 and the upper edge of the upper part 14. A screen 26 of sufficiently fine mesh to retain particles for treatment in the vessel 10 is arranged on the inlet 22. The central pipe 20 extends through the bottom 28 of the lower part 12 to the outside.

A first inlet chamber 30 is defined in the lower part 12 of the vessel 10 and adapted to be supplied through a first supply pipe end 32 with process gas, such as hot dry air. The first inlet chamber 30 contains a helix 34 extending in upward direction all round the central pipe 20 and imparting twist to the incoming process gas. The first inlet chamber 30 is defined upwardly by a ring of radial baffle plates 36 leaving free radial intermediate spaces 38 between them during normal operation. In some of these intermediate spaces 38 a plurality of nozzles 40 each are arranged so as to be offset radially with respect to one another. In the embodiment shown, six of a total of thirty six intermediate spaces 38 each contain three nozzles 40 which may be embodied by multiple-substance nozzles.

Figure 4:
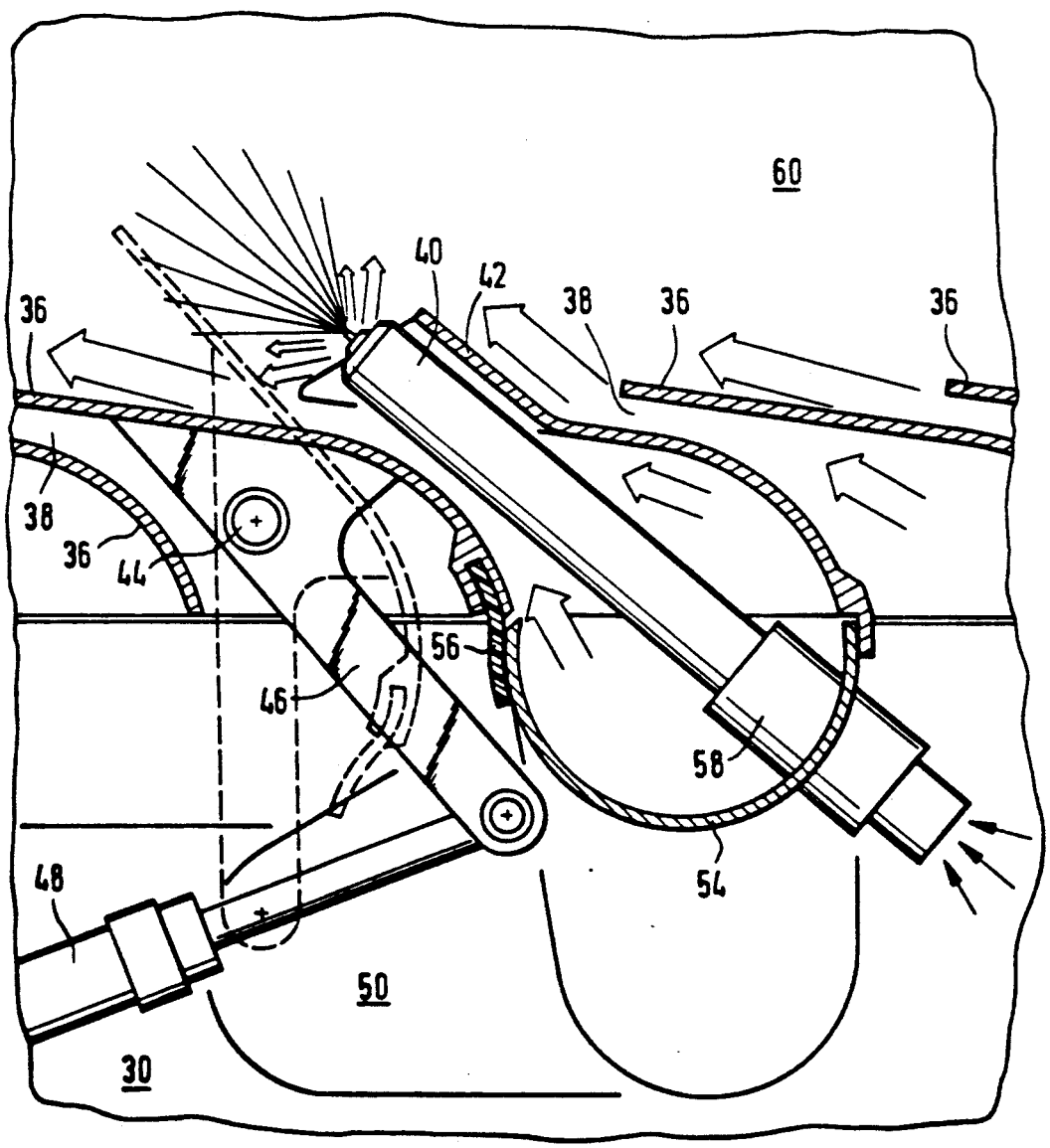
FIG. 4 is a greatly enlarged cutout of FIG. 1 showing further details.

Each of the nozzles 40 is protected to a large extent by a shield 42 against direct impact of particles to be treated. Each baffle plate 36 is pivotable about a respective radial support pin 44 between a closing position, a plurality of possible operating positions of which one is illustrated in solid lines in FIGS. 1 and 4, and a cleaning position indicated in discontinuous lines in FIG. 1 for two baffle plates 36. When in closed position, the baffle plates 36 overlap each other so as to present a tight intermediate floor. In their various operating positions, the baffle plates 36 cause more or less strong boosting of the twist already imparted by the helix 34 to the process gas introduced into the inlet chamber 30. In the cleaning position the baffle plates 36 are directed vertically upwardly. Each of the baffle plates 36 is equipped with a lever 46 for pivoting, the lever being pivotably supported at an infinitely controllable or even regulatable pneumatic or hydraulic piston and cylinder unit 48.

A second inlet chamber 50 is defined around the central pipe 20 in the upper end area of the helix 34; it is separated from the first inlet chamber 30 and can be supplied with process gas through a second inlet pipe end 52, independently of the first one. Passages 54 extend outwardly from the second inlet chamber 50 substantially radially. The number of passages 54 equals the number of intermediate spaces 38 furnished with nozzles 40. Thus there are six radial passages 54 in the embodiment shown. Each of these passages 54 shields one of the intermediate spaces 38 which include nozzles 40 against the first inlet chamber 30 and feeds process gas from the second inlet chamber 50 to the respective intermediate space.

In their region adjacent the second inlet chamber 50, the passages 54 have a U-shaped cross section which narrows down to an approximately semicircular cross section as the radial distance from the second inlet chamber 50 increases. Each of the passages 54 is sealed with respect to an adjacent pivotable baffle plate 36 by a sealing strip 56 which is attached to the baffle plate. Each nozzle 40 is secured for adjustment in longitudinal direction in a sleeve 58 which is fastened in the corresponding passage 54.

Figure 3:
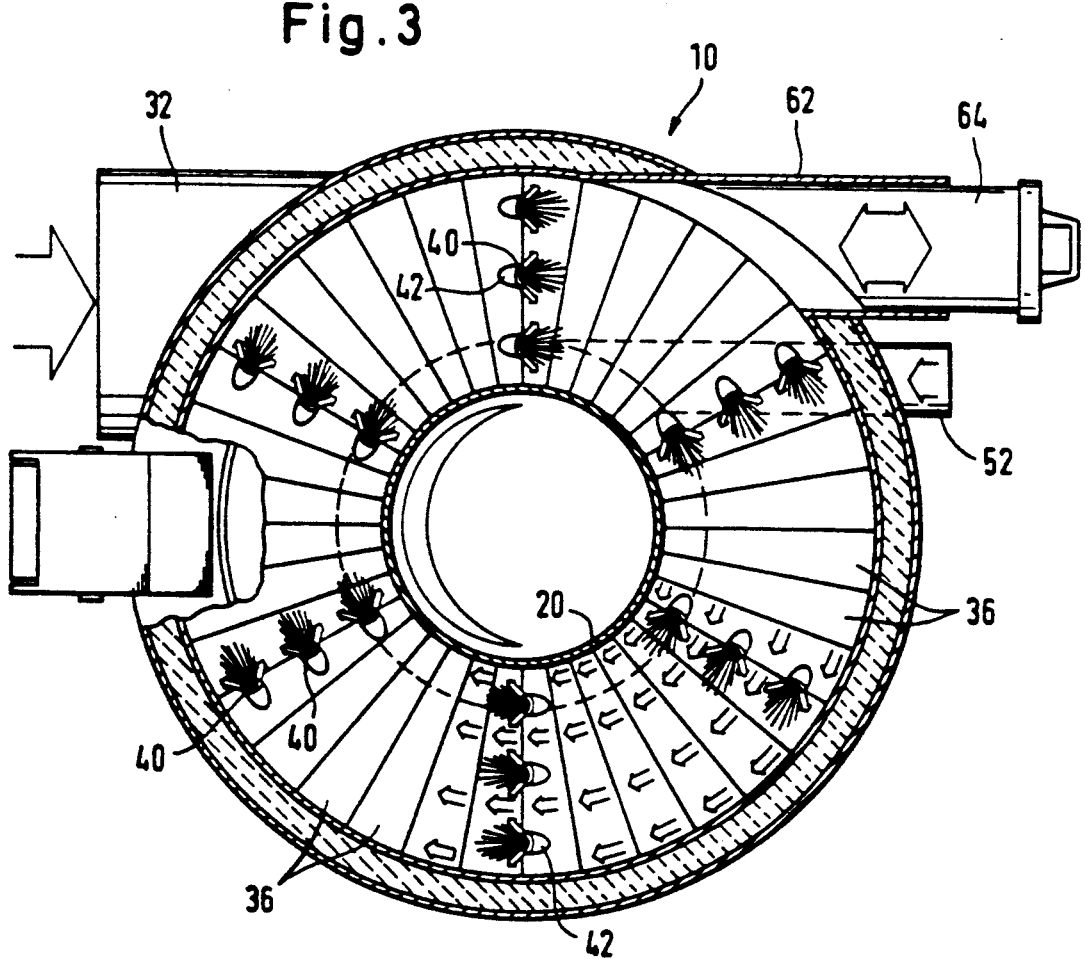
FIG. 3 is the horizontal cross section III—III in FIG. 1.

A fluidized bed space 60 is defined in the upper part 14 of the vessel 10. A discharge duct 62 for material, adapted to be closed by a plug 64, extends tangentially outwardly from the fluidized bed space. The plug 64 is illustrated in FIG. 3 in semi-withdrawn position. When the baffle plates 36 are in closing position, upon opening of the lid 16, the fluidized bed space 60 can be filled with particles to be treated, for instance up to approximately half its height.

Figure 5:
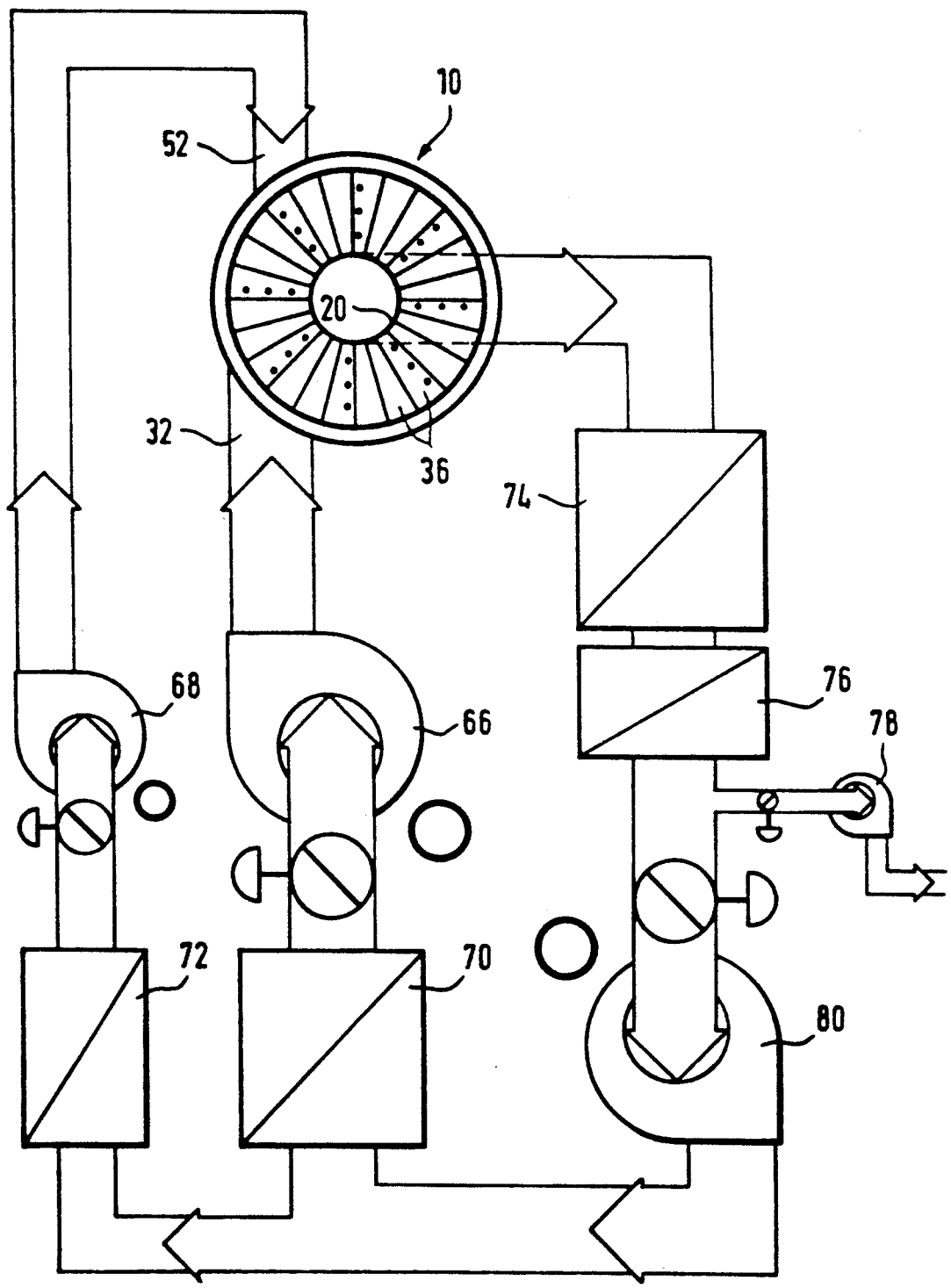
FIG. 5 is a circuit diagram of a fluidized bed apparatus according to the invention.

According to FIG. 5 the two inlet pipe ends 32 and 52 are connected to the pressure end of a respective fan 66 and 68 each whose suction end is connected to a make-up monoblock 70 to 72. Each monoblock 70 and 72 includes integrated filters, a condensator for solvent, as well as a process gas heater, with heat recovery provided for in per se known manner, if desired. The lower end of the central pipe 20 is connected through a dust collector 74 and a fine filter 76 to the suction end of a return air fan 78 whose pressure end is connected to the two make-up monoblocks 70 and 72. Between the fine filter 76 and the return air fan 78 a conduit is branched off to the outside which contains a negative pressure assuring fan 80.

The fluidized bed apparatus preferably is operated such that the process gas in each of the two inlet chambers 30 and 50 is at positive pressure of between 250 and 1000 kp/M$^2$, while stable low pressure of from 5 to 10 kp/M$^2$ prevails in the zone between the surface of the material to be treated which is fluidized in the fluidized bed space 60 and the lid 16. With this adjustment of the pressure relationships, the lid 16 can be opened while the process is under way, for example to draw samples of the material being treated.

What is claimed is:

1. A fluidized bed apparatus for treating particulate materials, comprising
    a vessel (10) with an entrance space (30, 50) and a fluidized bed space (60) located above the same,
    a ring of baffle plates (36) with intermediate spaces (38) in which a gas stream rising from the entrance space (30, 50) to the fluidized bed space (60) is given a twist, and
    nozzles (40) disposed in individual intermediate spaces (38) between a pair of baffle plates (36) each for spraying fluidizable substances into the gas stream, characterized in that
    a first inlet chamber (30) is arranged in the entrance space (30, 50) and only intermediate spaces (38) without nozzles (40) between baffle plates (36) communicate with said inlet chamber,
    the intermediate spaces (38) in which nozzles (40) are disposed are connected to an annular second inlet chamber (50) through a substantially radial passage (54) which shields them from the first inlet chamber (30), and
    the inlet chambers (30, 50) are adapted to be fed separately with process gas.

2. The fluidized bed apparatus as claimed in claim 1, characterized in that the second inlet chamber (50) is concentric with the vessel (10).

3. The fluidized bed apparatus as claimed in claim 2, characterized in that the second inlet chamber (50) extends all around a central pipe (20) for the discharge of process gas which pipe begins in an upper region of the fluidized bed space (60) and extends down and out of the vessel (10).

4. The fluidized bed apparatus as claimed in any one of claims 1 to 3, characterized in that separate fans (66, 68) are connected upstream of each of the two inlet chambers (30, 50).

5. The fluidized bed apparatus as claimed in claim 4, characterized in that a return air fan (78) is arranged downstream of the fluidized bed space (60) to maintain negative pressure in the fluidized bed space (60) as compared to the surroundings of the vessel (10), while positive pressure prevails in the two inlet chambers (30, 50).

* * * * *